D. J. FARTHING.
HARROW.
APPLICATION FILED NOV. 19, 1912.

1,070,332.

Patented Aug. 12, 1913.

WITNESSES

David J. Farthing,
INVENTOR

BY

ATTORNEY

UNITED STATES PATENT OFFICE.

DAVID J. FARTHING, OF BUTLER, TENNESSEE.

HARROW.

1,070,332.   Specification of Letters Patent.   Patented Aug. 12, 1913.

Application filed November 19, 1912.  Serial No. 732,333.

*To all whom it may concern:*

Be it known that I, DAVID J. FARTHING, a citizen of the United States, residing at Butler, in the county of Johnson and State of Tennessee, have invented a new and useful Harrow, of which the following is a specification.

The invention relates to improvements in harrows.

The object of the present invention is to improve the construction of harrows, and to provide a simple, inexpensive and efficient harrow of strong and durable construction, which at the same time will be light, easily handled and capable of smoothing and leveling the ground.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
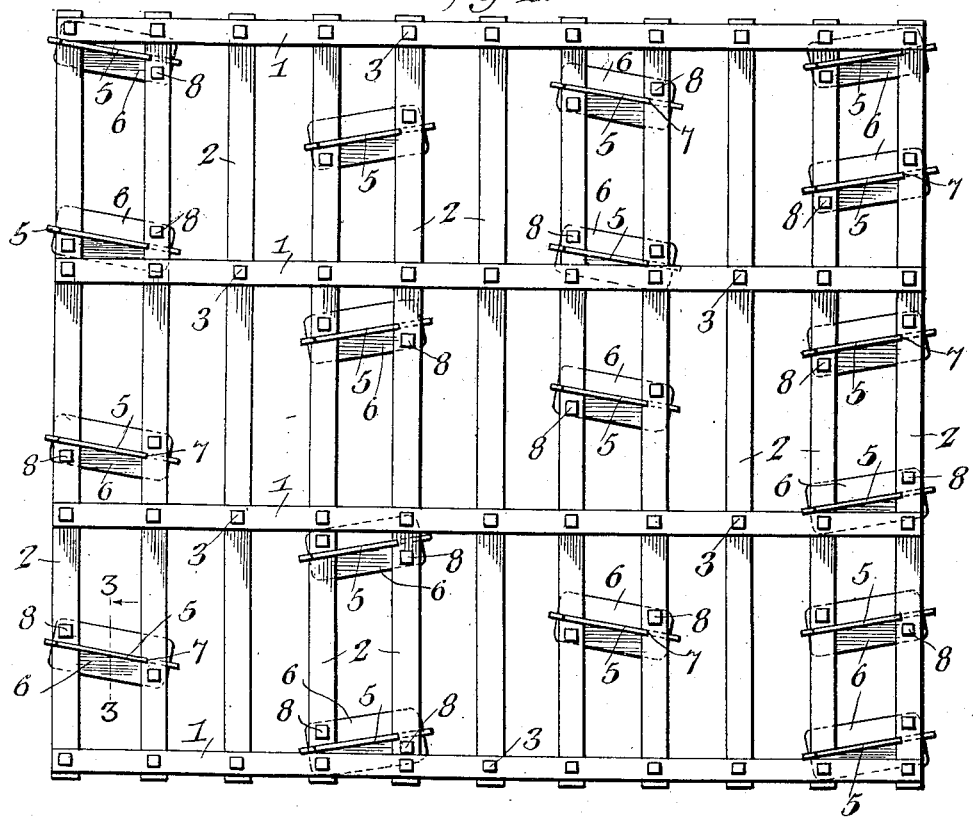
Figure 2:
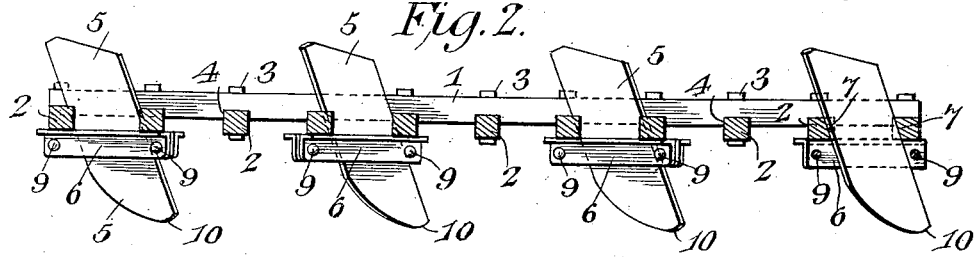
Figure 3:
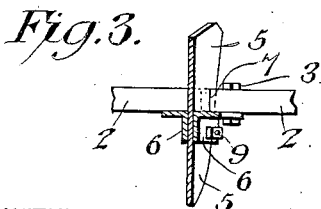
Figure 4:
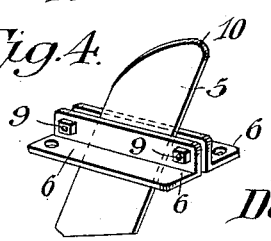
Figure 5:
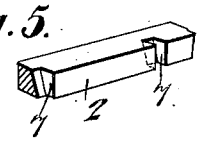

In the drawing: Figure 1 is a plan view of a harrow, constructed in accordance with this invention. Fig. 2 is a longitudinal sectional view of the same. Fig. 3 is a detail sectional view on the line 3—3 of Fig. 1. Fig. 4 is a detail perspective view of one of the blades and clamps. Fig. 5 is a detail view of a portion of one of the transverse bars.

Like numerals of reference designate corresponding parts in all the figures of the drawing.

In the accompanying drawing in which is illustrated the preferred embodiment of the invention, 1 and 2 designate longitudinal and transverse bars, designed to be constructed of any suitable material and constituting the frame of the harrow and arranged at right angles to one another and secured together in fixed relation by vertical bolts 3, which pierce the longitudinal and transverse bars. The longitudinal bars are provided at intervals in their lower faces with recesses 4 in which the transverse bars are firmly secured by the said bolts 3, the transverse bars being adapted to come in contact with the surface of the ground and keep the same level and smooth.

The harrow is equipped with transverse rows of harrow blades 5, constructed of steel and adjustably held between the sides or members 6 of clamps and having their side edges slidably fitted in opposite grooves 7 in the side faces of the transverse bars 2. The blades are of a width to extend across the spaces between the transverse bars, and the grooves interlock the front and rear edges of the harrow blades with the harrow frame and the blades are thereby supported and stiffened. Each clamp is composed of two pieces of angle iron or other suitable material, the angle sections or members of the clamp being composed of two sides or wings arranged at right angles to each other and disposed in horizontal and vertical planes, the horizontal flanges or wings being fitted against and secured to the lower faces of the transverse bars by vertical bolts 8. The clamps are of a length to extend across the space between the transverse bars, and the vertical flanges depend at the inner portions of the clamp sections and present relatively broad surfaces to the side faces of the blades for engaging the same. The vertical flanges are adjustably connected by front and rear horizontal bolts 9, located in advance and in rear of the blades and adapted to draw the said vertical wings or flanges into tight frictional engagement with the blades, whereby the latter are adjustably secured in the desired position.

The blades are adapted to be adjusted vertically to cause them to penetrate the soil to the desired depth, and their lower ends 10 are tapered or pointed, and they are set at an angle for throwing the soil laterally. The blades of each row are preferably arranged in parallelism, as shown, and the rows of blades are alternately set at opposite angles, the blades of each row being preferably at a slightly different angle from the blades of the other row. By setting the blades at different angles, the sods are severed or cut to pieces, and the soil is thoroughly stirred. The blades render the harrow light and easy running as they are adapted to readily cut through the soil, and land that is well plowed may be made into a perfect seed bed by a single operation of the harrow. In the accompanying drawing, the harrow is shown as a single harrow or harrow section, but in practice a harrow may be equipped with any desired number of harrow sections, as will be readily understood, and when three sections are employed, the intermediate section will be equipped with a seat for the accommodation of the driver. Also the harrow or harrow section may be equipped with any desired number of rows of harrow blades, which may be arranged at any preferred interval and at any desired angle.

What is claimed is:—

1. A harrow of the class described including a harrow frame composed of spaced side bars and transverse connecting bars arranged at intervals and secured to the side bars in fixed relation, vertically adjustable harrow blades arranged between the transverse bars and being of a width to extend across the spaces between the same, and clamping devices spanning the spaces between the transverse bars and engaging the harrow blades at opposite sides thereof and securing the said blades in their vertical adjustment.

2. A harrow of the class described including spaced transverse bars mounted in fixed relation and provided with opposite grooves, vertically adjustable harrow blades extending across the spaces between the bars and having their side edges arranged in the said grooves, and clamping devices also spanning the spaces between the harrow bars and engaging the blades at the side faces thereof and securing the same in their adjustment.

3. A harrow of the class described including spaced transverse bars, harrow blades arranged between the transverse bars and being of a width to extend across the spaces between the same and set at an angle, and fastening means carried by the transverse bars for securing the blades.

4. A harrow of the class described including spaced transverse bars, and transverse rows of harrow blades, said blades being arranged in the spaces between the harrow bars and being of a width to extend across the said spaces, the blades of the rows being set at different angles.

5. A harrow of the class described including spaced transverse bars, and transverse rows of harrow blades, said blades being arranged in the spaces between the harrow bars and being of a width to extend across the said spaces, the blades of each row being in parallelism and the rows of blades being alternately set at opposite angles.

6. A harrow of the class described including spaced transverse bars, and transverse rows of harrow blades, said blades being arranged in the spaces between the harrow bars and being of a width to extend across the said spaces, the blades of each row being in parallelism and the rows of blades being alternately set at opposite angles and each row of blades being at a slightly different angle.

7. A harrow of the class described including spaced transverse bars, harrow blades arranged in the spaces between the bars, and clamps extending across the spaces between the bars and composed of two members adjustably connected and engaging the side faces of the harrow blades and adjustably connecting the same with the bars.

8. A harrow of the class described including spaced transverse bars, harrow blades arranged in the spaces between the bars, and clamps extending across the spaces between the bars and composed of two angle members having horizontal flanges secured to the said bars, and vertical flanges located at opposite sides of the blades and engaging the same, and means for adjustably connecting the vertical flanges to cause the same to grip the blades.

In testimony, that I claim the foregoing as my own, I have hereto affixed my signature in the presence of two witnesses.

DAVID J. FARTHING.

Witnesses:
  E. M. MILLER,
  S. C. YOUNCE.

---

Copies of this patent may be obtained for five cents each, by addressing the "Commissioner of Patents, Washington, D. C."